United States Patent [19]
Wenzel

[11] Patent Number: 5,695,131
[45] Date of Patent: Dec. 9, 1997

[54] SHREDDER SEPARATOR

[75] Inventor: Reiner Wenzel, Coorparoo old, Australia

[73] Assignee: B & W, Inc., San Francisco, Calif.

[21] Appl. No.: 605,479

[22] Filed: Feb. 26, 1996

[51] Int. Cl.$^6$ .................... B02C 19/12; B02C 23/08
[52] U.S. Cl. .................. 241/24.17; 241/27; 241/34; 241/79.1; 241/222; 241/DIG. 31
[58] Field of Search ............... 241/24.1, 34, DIG. 31, 241/24.17, 27, 221, 222, 223, 79.1

[56] References Cited

U.S. PATENT DOCUMENTS

| | | | |
|---|---|---|---|
| 3,868,062 | 2/1975 | Cunningham et al. | 241/36 |
| 4,015,782 | 4/1977 | Granite | 241/62 |
| 4,684,071 | 8/1987 | Dicky | 241/80 |
| 4,927,088 | 5/1990 | Brewer | 241/223 |
| 5,390,861 | 2/1995 | Bishop | 241/24 |
| 5,433,391 | 7/1995 | Jagger et al. | 241/34 |

Primary Examiner—John M. Husar
Attorney, Agent, or Firm—Robbins, Berliner & Carson, LLP

[57] ABSTRACT

A device and method for both liberating rubber from other parts of a tire, and cutting the rubber and other parts to an appropriate size for recycling.

17 Claims, 5 Drawing Sheets

5,695,131

SHREDDER SEPARATOR

TECHNICAL FIELD OF THE INVENTION

This invention relates to recycling devices, and more specifically to devices for shredding and separating rubber from other parts of a tire, such as steel.

BACKGROUND OF THE INVENTION

Tires are typically constructed of one or more pliable materials, such as rubber, and a supportive belting, made out of generally inelastic materials, such as steel. To recycle tires requires that the rubber portion of the tire be separated from other materials, and cut to a proper size. The majority of tires currently in use employ steel belts, to prevent puncture and related tire failure. Tires are typically molded by adding uncured rubber into a mold already containing the steel belt. The rubber is then heat cured. This results in the rubber not only surrounding the steel belt, but adhering to it as well. Thus it is difficult to separate the rubber from the belt.

Recycling devices currently in use typically employ a device to cut the material to be recycled into an appropriate size for further treatment. These devices are usually designed for cutting only and do not separate out the steel belts.

Additionally, such prior art devices are adapted for cutting inelastic materials, such as wood, metals, hard thermoplastic materials and cables. Rubber used in tires is pliable and adapted to resist puncture or cutting. Resistance by rubber to cutting is exacerbated by the strength of the steel belts. Such resistance results in incomplete cuts, leaving portions of the tire still attached to those parts in the machine. Thus, when prior art devices are used with tires, the result is that rather than cutting the tire into appropriately sized pieces, large portions of the tire are pulled into the machine, often resulting in premature machine failure.

One wishing to separate rubber from steel in a tire using current machines must first precut the tire and belt, and feed it into a cutting machine. Since prior art devices do not cut and separate in a single operation, the only way to perform such an operation is to run the tire through many such machines, each machine cutting the tire into progressively smaller pieces, until eventually the rubber is liberated from the steel. The use of multiple machines is costly, time consuming, and requires extensive and expensive floor space.

What is needed is a way of reducing the ecological impact of discarded tires by providing a convenient, economical and compact way to liberate the rubber from the steel and other tire parts, while simultaneously cutting the parts into an appropriately small size for physical separation and recycling, all in a single operation.

SUMMARY OF THE INVENTION

The present invention provides a device and method for both liberating rubber from other the parts of a tire, and cutting the rubber and other parts to an appropriate size to allow recycling.

In a first embodiment, the present invention provides a device for cutting tires and separating the elastomeric materials from the inelastic materials therein, comprising a cutting means, an intake means, and a motor means whereby tires are fed into the cutting means by the intake means at a slower speed than said tires are urged into the cutting means, causing a stretching of the elastomeric materials but not the inelastic materials thereby liberating the elastomeric materials from the inelastic materials.

In another embodiment, the present invention provides a method for cutting tires and liberating elastomeric materials from inelastic materials therein, comprising the steps of pulling a tire, opposing such pulling, and cutting and compressing the tire between two surfaces.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT

Figure 1:
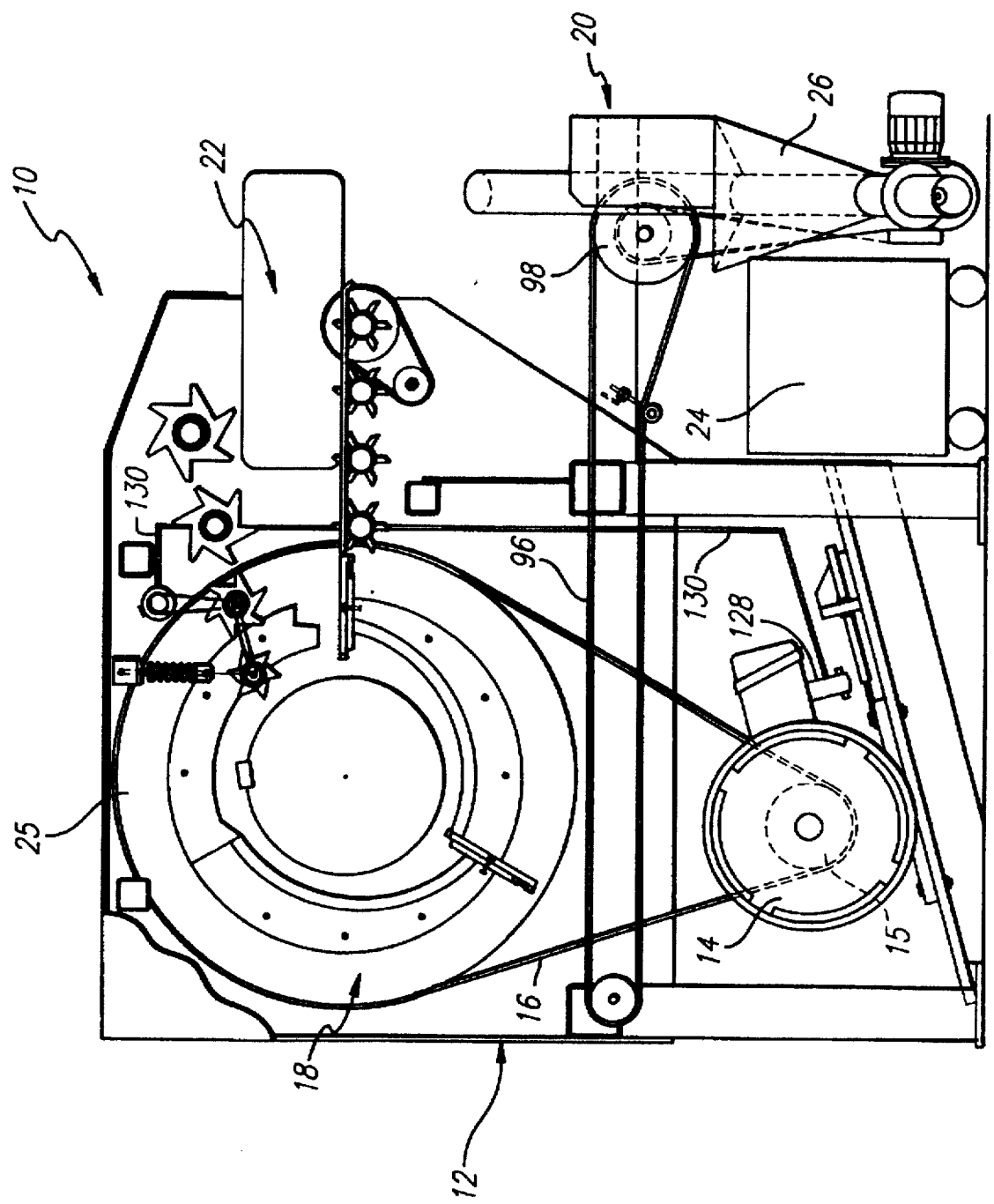
FIG. 1 is a cross sectional, elevation view of the present invention.

FIG. 1 shows a shredder/separator 10 constructed according to the present invention. The shredder/separator 10 has a frame 12, which is generally box shaped, to which a drive motor 14 is bolted. The drive motor 14 has a motor shaft 15 which rotates in response to the drive motor 14. A drive belt 16 is wrapped around the motor shaft 15 and is also wrapped around a flywheel 25. The flywheel 25 is part of a shredding mechanism 18 (described below) and thus rotational movement is transmitted from the drive motor 14 to the shredding mechanism 18. The shredding mechanism 18 is also bolted to the frame 12. The shredding mechanism 18 is coupled to an intake means 22 by bolting or welding, which feeds the tire into the shredding mechanism 18. In a preferred embodiment, the shredder/separator 10 also includes a conveyer means, such as conveyer belt 96, for receiving the newly cut and liberated tire pieces (i.e., rubber and steel pieces) from the shredding mechanism 18 and transferring these pieces to a magnetic separator 20 for segregating the rubber and the steel pieces into separate receptacles, such as steel receptacle 24 and rubber receptacle 26. Other types of feeders, such as a vibrating feeder (not shown) may be substituted for the conveyer belt 96.

Figure 2:
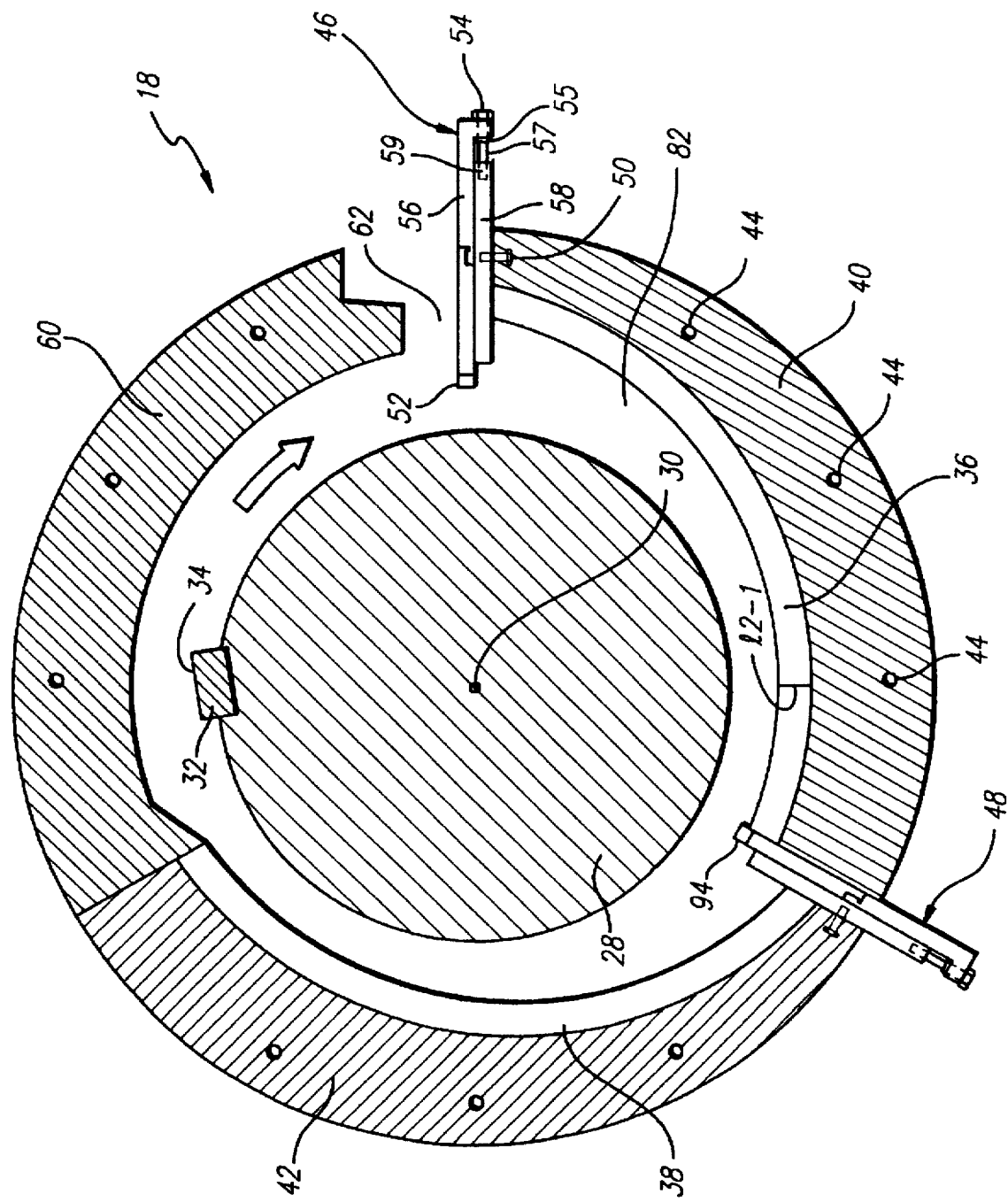
FIG. 2 is a cross sectional view of a portion FIG. 1, showing the shredding mechanism 18.

Referring to FIG. 2, the shredding mechanism 18 comprises a rotor 28, which is generally drum shaped, and is pivotally mounted to the frame 12. The size of the rotor 28 is generally limited by the maximum speed at which it is to turn and whether it is adapted to accept one or two tires simultaneously. Thus the diameter is approximately 500 millimeters, while the height can range from 1000 millimeters, for a shredder/separator 10 designed to only accept one tire at a time, to 1500 millimeters, for a shredder/separator 10 designed to accept two tires at a time. Because both function in an identical manner, only the 1000 millimeter model will be discussed.

As noted above, in a preferred embodiment the rotor 28 is coupled to the drive motor 14 via the flywheel 25, drive belt 16, and motor shaft 15, rotating in response to rotational movement of the drive motor 14. Mounted to the rotor 28 are one or more rotating blades 32 for cutting tires and liberating rubber therefrom. Each rotating blade 32 is mounted at an angle to the rotor 28, such that when in proximity to one of the fixed blades, such as first fixed blade assembly 52, the rotating blade 32 is at an angle of approximately one hundred and five degrees relative to the fixed blade. Each rotating blade 32 has a broad cutting face 34.

Figure 4:
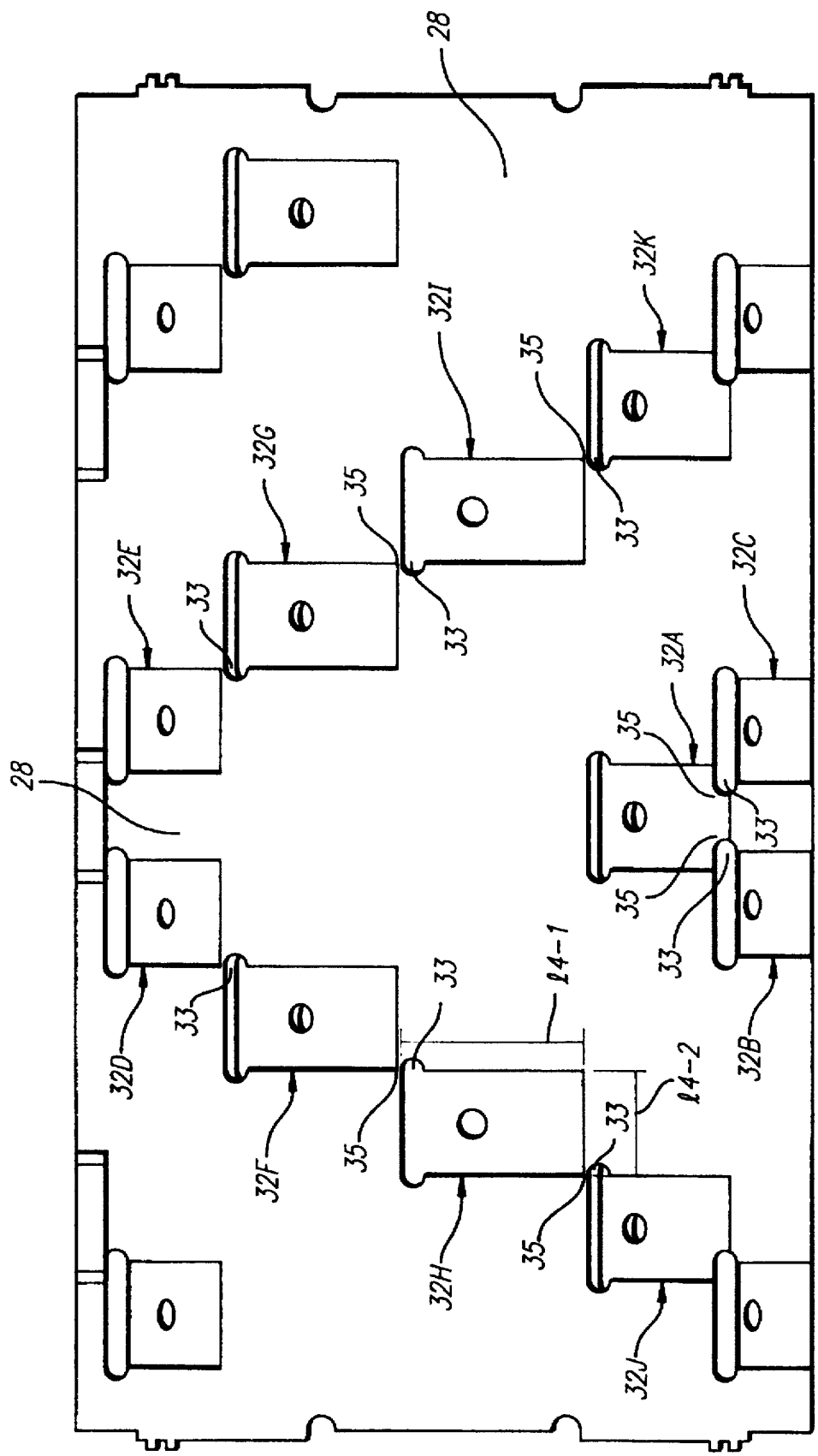
FIG. 4 is a top, plan view of the rotor (28) of FIG. 1.

The rotating blades can be better seen in FIG. 4, where rotating blade 32-H is shown with its broad cutting face 34. Rotating blade 32-H can be produced in various sizes. However it has been found that the advantages of the present invention (described herein) are best achieved when the broad cutting face 34 has a width (along line 4-2) that is no greater than its height (along line 4-1). In particular, the use of rotating blades (such as rotating blade 32-H) in which the broad cutting face 34 has a width (along line 4-2) of approximately fifty millimeters and a height (along line 4-1) of approximately seventy millimeters, has been found to work particularly well. The rotating blades 32 can be made of any sufficiently durable material, such as white iron type A 15-3, a hard alloy white iron casting.

Referring to FIG. 2, the shredding mechanism 18 also includes one or more filter screens which allow pieces of newly liberated rubber or steel of up to a predetermined size to escape from the shredding mechanism 18, such as first filter screen 36 and second filter screen 38. The filter screens are of the same dimensions, so only the first filter screen 36 will be described in detail. The first filter screen 36 is semicircular in shape, and has a width (along line 2-1) of approximately sixteen millimeters and a depth which is perpendicular to said width of approximately one thousand millimeters.

Each filter screen is bolted to a screen frame. Thus the first filter screen 36 is bolted to a first screen frame 40, and the second filter screen 38 is bolted to a second screen frame 42. The first filter screen 36 and the second filter screen 38 contain apertures (not shown), passing in the direction of line 2-1, through which appropriately sized pieces of rubber and steel may pass. The apertures on the respective filter screens may be of differing sizes. For instance, the apertures passing through first filter screen 36 typically have a diameter of approximately 25 millimeters. In a preferred embodiment, the apertures passing through the second filter screen 38 are approximately five millimeters in diameter, smaller than those passing through the first filter screen 36, to reduce the average size of rubber and steel pieces produced.

The filter screens and screen frames partially surround the rotor 28, forming a gap between the screen frames and the rotor 28. In a preferred embodiment, this takes the form of a variable gap 82 (discussed below). The screen frames are mounted to a wall (not shown) of the shredder/separator 10 by bolts inserted into apertures in the screen frames, such as apertures 44.

The screen frames are secured to cutter mounts, such as first cutter mount 46 and second cutter mount 48, by bolts 50 (shown in phantom). Since both cutter mounts are similar in function, only the first cutter mount 46 will be discussed in detail. The first cutter mount 46 includes a first fixed blade assembly 52, comprising a row of in-line blades, located adjacent to the rotor 28, which when meshed in opposition to a rotating blade 32, forms a cutting and tearing device as described below. The first fixed blade assembly 52 consists of up to six blades, each measuring up to twenty five millimeters in height, two hundred and seventy four millimeters in width, and one hundred and seventy millimeters in depth. The fixed blades can be made of any sufficiently durable material, such as DOMITE®, a hard alloy white iron casting with a metallurgically bonded mild steel backing plate. The first fixed blade assembly 52 is mounted to a blade adjustment arm 56, which in turn is slidably mounted to a mounting base 58. An adjustment bolt 54 has a lip 55, a shaft 57, and a threaded base 59. The shaft 57 passes through the blade adjustment arm 56 and the threaded base 59 adjustably screws into the mounting base 58, allowing the user to slide the blade adjustment arm 56 along the mounting base 58, thereby controlling the distance between the first fixed blade assembly 52 and a rotating blade 32, by rotating the adjustment bolt 54 which in turn causes the lip 55 to urge the blade adjustment arm 56 inward and outward. In normal operation, the distance between the first fixed blade assembly 52 and the rotating blade 32 would be set to between one and two millimeters.

A mounting frame 60 is also provided. The mounting frame 60 is similar in dimensions to the screen frames, and is bolted to the second cutter mount 48 and to the frame 12, but is not connected to a filter screen. The first cutter mount 46, first screen frame 40, second cutter mount 48, second screen frame 42, and mounting frame 60 form a semicircle describing an intake aperture 62 for receiving tires from the intake means 22 into the shredding mechanism 18. The first cutter mount 46, first screen frame 40, second cutter mount 48, second screen frame 42, and mounting frame 60 are bolted together and form a structural member of the shredder/separator 10 and increase the strength of the frame 12 thereof.

The variable gap 82 between the first filter screen 36 and the rotor 28 is widest adjacent to the point of coupling between the first filter screen 36 and the first cutter mount 46, and narrowest adjacent to the point of coupling between the first filter screen 36 and the second cutter mount 48. In a preferred embodiment, this variation is between approximately five and fifteen millimeters. Similarly, the variable gap 82 between the second filter screen 38 and the rotor 28 is widest adjacent to the point of coupling between the second filter screen 38 and the second cutter mount 48 and narrowest adjacent to the point of coupling between the second filter screen 38 and the mounting frame 60.

Figure 3:
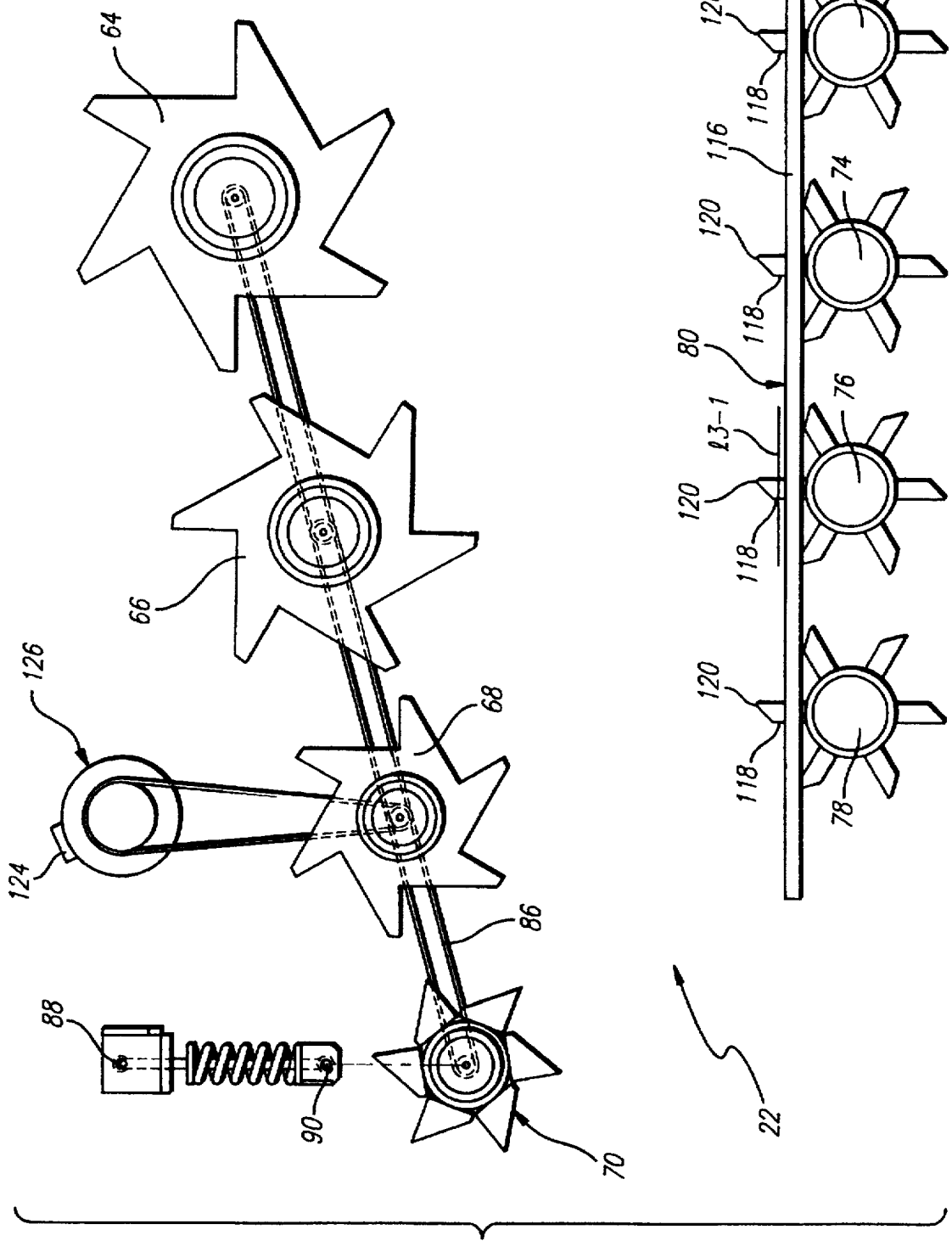
FIG. 3 is a cross sectional view of a portion of FIG. 1, showing an intake means 22.

Referring to FIG. 3, the intake means 22 is coupled to the shredding mechanism 18 at a point adjacent to the intake aperture 62 and the first cutter mount 46. The intake means 22 has an intake roller 70 for urging tires into the shredding mechanism 18 at a predetermined rate of speed, also adjacent to the first cutter mount 46. In a preferred embodiment, the intake roller 70 turns at the rate of approximately six revolutions per minute.

The intake means 22 has one or more upper rollers for urging tires into the shredding mechanism 18, such as upper roller 64, upper roller 66, and upper roller 68, which are configured in-line with the intake roller 70, forming an upward sloping line. The upper rollers 64, 66 & 68 are blunt tipped, and may be made from mild steel. The spacing between upper roller 64 and upper roller 66 is approximately two hundred and thirty eight millimeters; between upper roller 66 and upper roller 68 approximately two hundred and nineteen millimeters; and between upper roller 68 and intake roller 70 approximately one hundred and seventy nine millimeters. The upper rollers 64, 66 & 68 and the intake roller 70 may be powered by the a single intake motor (not shown) and turn at the same number of revolutions per minute. However, the circumferences formed by the tips of the upper rollers 64, 66 & 68 and the intake roller 70 are progressively smaller, specifically seventy hundred and ninety four millimeters for upper roller 64, six hundred and sixty five millimeters for upper roller 66, Five hundred and ninety millimeters for upper roller 68, and four hundred and ninety six millimeters for intake roller 70, so that the tips of upper roller 64 turn at a faster rate of speed than those of upper roller 66, which turn at a faster rate than those of upper roller 68, which is nonetheless faster than intake roller 70. This results in tires being fed into the intake roller 70 at a an even pace, assuring that when a given tire has entered the intake aperture 62 another tire is in the proper position to be urged inward.

The intake means 22 also has one or more lower rollers, such as lower roller 72, lower roller 74, lower roller 76, and lower roller 78, which are configured in-line at a horizontal orientation and have spiked tips, such as spiked tips 120. The lower rollers 72, 74, 76, and 78, are spaced one hundred and seventy two millimeters apart and are made from mild steel. The spiked tips 120 describe a circumference of approximately five hundred and fifteen millimeters. The lower rollers 72, 74, 76, 78, may be powered by the same motor (not shown) and are covered by a plate 116, having floor apertures 118, which measure approximately one hundred and forty two millimeters in length (along line 3-1) and eighteen millimeters in width, through which the spiked tips 120 pass, creating a moving floor 80 which provides a surface along which tires may pass en route to the shredding mechanism 18 urged inward by the spiked tips 120 of the lower rollers 72, 74, 76, & 78.

The intake means 22 includes a means for adjusting the size of the aperture formed by the gap between the intake roller 70 and the moving floor 80. In a preferred embodiment, this takes the form of a progressive spring 84, which can be prepared in any number of ways, including heat curing, such that it exerts approximately the same force at all points in its compression stroke. The progressive spring 84 has a first end 88 and a second end 90. The first end 88 is bolted to the frame 12 (FIG. 1) and the second end 90 pivotally mounted to the intake roller 70. The travel of the intake roller 70 can be limited to approximately vertical travel in a number of ways, for instance, by pivotally connecting the intake roller 70 and the first end 88 of the progressive spring 84 to one end of a pivoting arm 86 (shown in relief), the other end of which is pivotally mounted to a point adjacent to the center of upper roller 68. The pivoting arm 86 also contains a mechanical linkage (not shown), transferring all rotational movement between the intake roller 70 and upper rollers 64, 66 & 68.

In a shredder/separators 10 so equipped, a sensing means 128 (FIG. 1) is provided for determining the amount of tire material in within the intake aperture 62 and the variable gap 82, and varying the speed of the intake roller 70 in response thereto. The sensing means 128 can consist of any number of electronic devices, such as commercially available current sensing relays. Such sensing means can be located anywhere along an electrical circuit that powers the drive motor 14.

The sensing means 128 senses the current load drawn by the drive motor 14. The greater the volume of tire material, the greater the current load. When the sensing means 128 determines that the volume of tire material within the intake aperture 62 and the variable gap 82 exceeds a predetermined maximum level, such as eighty percent of the rated full load current for the drive motor 14, a signal is sent by the sensing means 128 to the variable governor 124 reducing the electrical frequency of the power supply to the intake motor 126 by a predetermined amount, typically between five and twenty hertz, thereby reducing the speed of the intake motor 126. This in turn reduces the speed of the intake roller 70, upper roller 68, upper roller 66 and upper roller 64. Conversely, if the sensing means 128 detects that the volume of tire materials within the intake aperture 62 and the variable gap 82 falls below a predetermined minimum level, such as forty percent of the rated full load current for the drive motor 14, the sensing means 128 sends out a signal to the variable governor 124 increasing the electrical frequency of the power supply to the intake motor 126 by a predetermined amount, typically between five and twenty hertz, thereby increasing the speed of the intake motor 126. This in turn increases the speed of the intake roller 70, upper roller 68, upper roller 66 and upper roller 64. This assures that the shredding mechanism 18 will always be processing an optimal amount of material.

Referring to FIG. 4, in a preferred embodiment of the present invention, the rotating blades, such as rotating blade 32 (see also FIG. 2) and rotating blades 32A–K form a reverse chevron, for urging tire parts away from the sides of the rotor 28 and towards the center, to avoid jamming the mechanism. Each rotating blade on the left hand side of the rotor 28 (i.e., to the left of rotating blade 32-A), such as rotating blades 32-B, 32-D, 32-F, 32-H, and 32-K, has a leading corner 33 and a trailing corner 35, which are located diagonally to each other, and are arranged so that the leading corner 33 of one blade, such as rotating blade 32-H, touches the trailing corner 35 of an adjacent blade, such as rotating blade 32-F. The blades on the right hand side of the rotor 28 (i.e., to the right of rotating blade 32-A) are a mirror image of the blades on the left hand side. Center mounted blades, such as rotating blade 32-A have two trailing corners 35, such that diagonal lines are formed by the chains of rotating blades on both the left and right sides, resembling a reverse chevron. It should be understood that other configurations can be substituted for the reverse chevron, such as a spiral, angled, stepped, offset, and others.

In operation, the user will feed whole tires (or, optionally, parts of tires) into the intake means 22. The lower rollers 72–78 and the upper rollers 64–68 will urge the tires along the moving floor 80 towards the shredding mechanism 18. The faster moving rollers, such as upper roller 64, will insure that an adequate supply of material is available for processing. When the tire reaches intake roller 70, the downward pressure exerted by the force of the progressive spring 84 against the intake roller 70 urges the spiked tips 92 into the tire, causing it to advance at a predetermined pace (approximately six revolutions per minute).

As the tire enters the variable gap 82, the rotor 28 is turning at approximately three hundred revolutions per minute). One or more rotating blades, such as rotating blade 32 will urge the tire around the circumference of the rotor 28, causing the tire to make an approximately 90 degree turn against the first fixed blade assembly 52. The speed at which the rotor 28 turns is designed to be faster than the speed at which the intake roller 70 advances the tire. Due to the interconnection of the intake roller 70 to the upper rollers 64, 66 & 68 by the mechanical linkage (not shown), any attempt to pull tires engaged with the intake roller 70 into the variable gap 82 at a speed faster than the speed of the intake roller 70 (e.g., six revolutions per minute) will result in tremendous torque forces being exerted against such movement.

Thus while the rotating blades, such as rotating blade 32 pull the tire, such force is restrained by the intake roller 70. This pulling action stretches the rubber component of the tire, which is quite elastic, but does not significantly stretch the steel belt or other non-elastic portions. The stretching of the rubber against the inelastic steel liberates the rubber from the steel. A further stretching occurs due to the reverse chevron pattern of the rotating blades. Referring to FIG. 4, as rotating blade 32D, for example, urges forward part of a tire, resisted by the intake roller 70, it can be seen the portion of the tire adjacent to but not touched by rotating blade 32D would not receive the same stretching forces as the portion so touched. Therefore the border between the portion of the tire engaged by rotating blade 32D and the portion not so engaged would be subject to additional stretching forces, further liberating the rubber from the steel.

The rotating blades, such as rotating blade 32, not only cut tires against the first fixed blade assembly 52 (as well as a second fixed blade assembly 94, attached to the second cutter mount 48), but compress the tire against the fixed blades using its broad cutting face 34. This compression of rubber (being elastic) against the non-elastic steel belts causes the tire to cut itself apart, further assisting the liberation of the rubber from the steel.

As the newly cut tire pieces (with rubber liberated from steel) are urged around the variable gap 82 by the rotating blades, the action of the rotating blades as well as the force of gravity push the tire pieces against the first filter screen 36. Pieces small enough to fit through the first filter screen 36 fall into an appropriate receptacle or conveying means, such as conveyer belt 96. Pieces too large to pass though the first filter screen 36 are still pushed against it, causing a sheeting of rubber off of such pieces, further reducing their size and resulting in such sheered off materials passing through the first filter screen 36. Additionally, as the distance between the rotor 28 and the first filter screen 36 decreases (as tire pieces travel between the first fixed blade assembly 52 and the second fixed blade assembly 94), some of the tire pieces will be pressed with greater force against the first filter screen 36 as they approach the second fixed blade assembly 94, further sheering such pieces. Some of these pieces will then be small enough to pass through the first filter screen 36.

Tire pieces that do not pass through the first filter screen 36 are urged by the rotating blades to the second fixed blade assembly 94, which acting against the rotating blades, such as rotating blade 32, further cuts and compresses such tire pieces in the same manner as the first fixed blade assembly 52. Because the second filter screen 38 is angled in the same way as the first filter screen 36, that is, the distance between the second filter screen 38 and the rotor 28 decreases as tire pieces pass from the second fixed blade assembly 94 to the end of the second filter screen 38 adjacent to the mounting frame 60, the same kind of sheering occurs as was described above with reference to the first filter screen 36. Tire pieces not passing through the second filter screen 38 will be urged around the circumference of the rotor 28 and the process will be repeated when they reach the first fixed blade assembly 52. The pressure forcing the tire pieces against the first filter screen 36 and the second filter screen 38, urge such pieces outward. Absent such pressure, only gravity would urge tire pieces through the filter screens. Supplementing the force of gravity with such outward pressure both increases the volume of tire pieces escaping through the filter screens and allows said filter screens to surround a larger portion of the rotor 28, even to the point where the first filter screen 36 or the second filter screen 38 is in vertical or upside-down orientation. This allows the shredder/separator 10 to utilize screens covering, in a preferred embodiment, up to two hundred and seventy degrees of the semicircle formed by the screens.

Tire pieces small enough to pass through the first filter screen 36 or the second filter screen 38 will fall outwards and downwards and land in an appropriate receptacle or conveying means, such as conveyer belt 96. Conveyer belt 96 transfers the tire pieces to the magnetic separator 20 which may take any number of forms, such as an overhead magnet (not shown), or in a preferred embodiment, a magnetic pulley 98. As the conveyer belt 96 passes over and around the magnetic pulley 98, the conveyer belt 96 is rotated to an upside-down orientation. As the conveyer belt 96 is rotated, the rubber pieces fall off into the rubber receptacle 26. Due to the magnetic attraction of the magnetic pulley 98, steel pieces adhere to the conveyer belt 96. As the now upside-down conveyer belt 96 passes away from the magnetic field of the magnetic pulley 98, and over the steel receptacle 24, the magnetic attraction of the magnetic pulley 98 no longer holds the steel pieces in place and they drop into the steel receptacle 24. Thus the tire has been reduced to separated steel and rubber pieces of a proper size for recycling, in a single operation.

Figure 5:
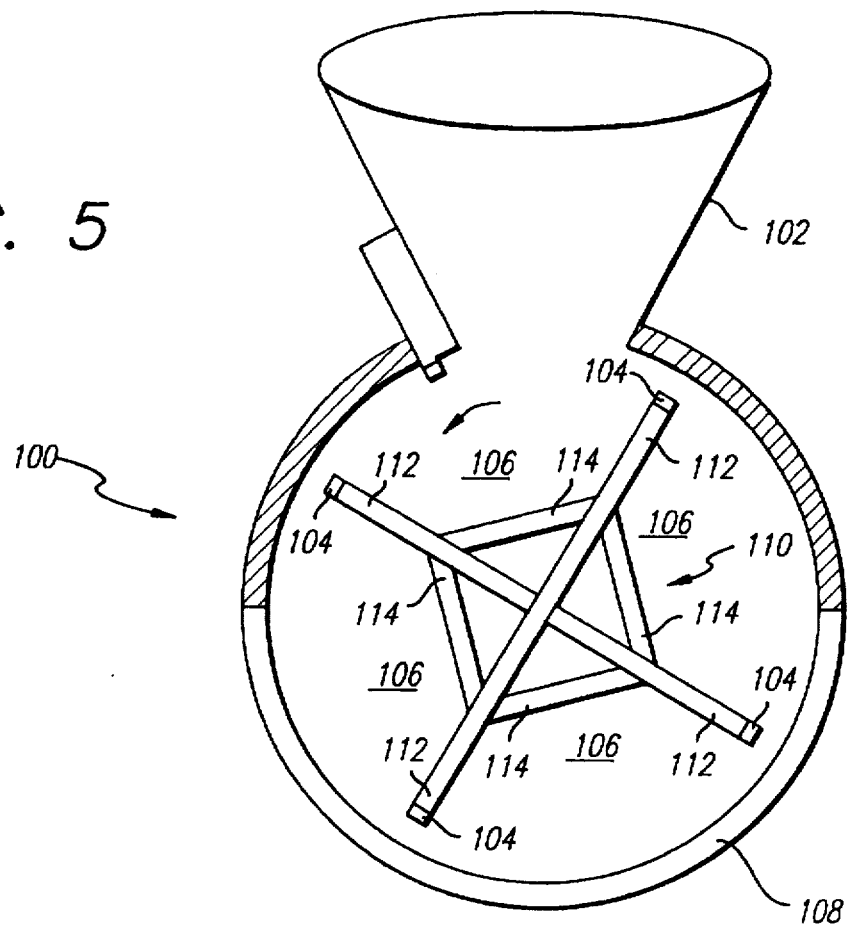
FIG. 5 is a cross sectional view of the shredding and intake means of a prior art shredding device.

FIG. 5 shows a portion of a prior art shredder, a shredding area 100 containing a prior art rotor 110 (shown also in FIG. 6) which includes cutting mounts 112, narrow-faced blades 104, and cutting mount cross supports 114, and an intake funnel 102. Unlike the present invention, such devices have no rollers or other powered intake devices within the intake funnel 102. Thus only gravity and whatever pulling forces are exerted by the shredding area 100 will urge tires inward. The shredding area 100 includes a plurality of narrow-faced blades 104. The lack of a powered intake device requires that, rather than the generally round rotor of the present invention, the narrow-faced blades 104 have chasms 106 between them. This allows a greater volume of material to be grasped by the narrow-faced blades 104 and pulled inward. Unfortunately, tires tend to become trapped within the chasms 106 and eventually can jamb such prior art machines.

Figure 6:
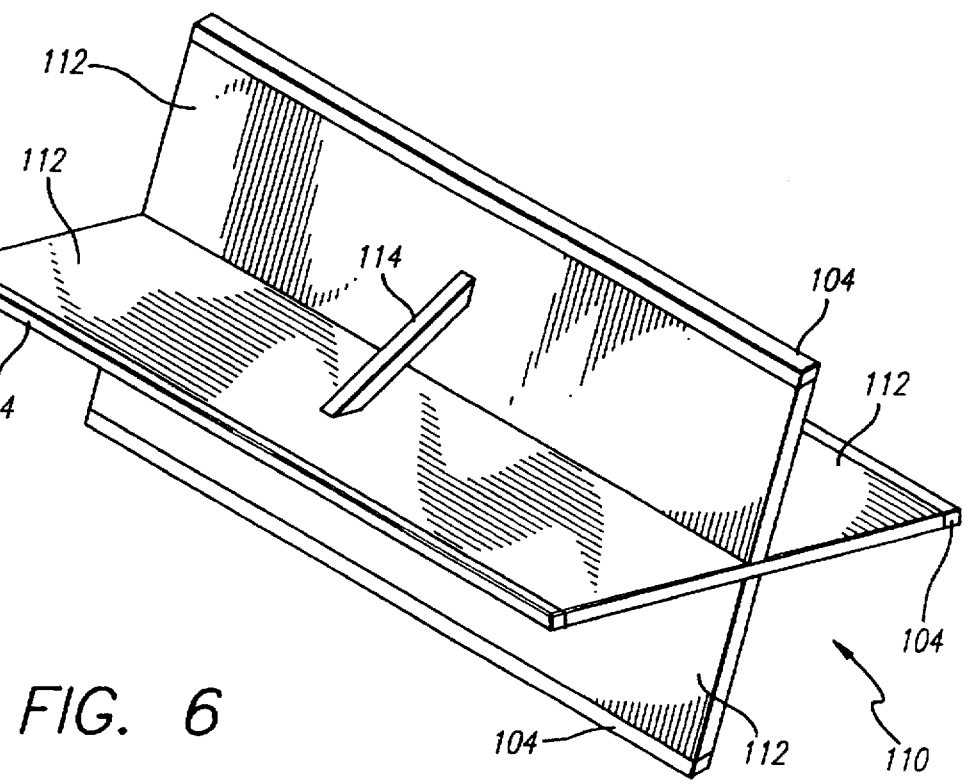
FIG. 6 is an isometric view of the rotor (110) of FIG. 5.

Prior art shredders also included a screen, such as screen 108 for allowing chopped pieces of a certain size to escape from the shredding area 100 into an appropriate receptacle. Since such screens lack the screen frame secured to the frame of the present invention, they will tolerate less pressure before failing. Thus, no sheering can occur against the screen 108 without risking unit failure. For the same reason, only the force of gravity urges chopped pieces out of the screen 108, limiting the portion of the shredding area 100 that can be covered to less than one hundred and eighty degrees. Most significantly, the chopped pieces passing through the screen 108 will contain rubber still bonded to the steel belt material, and not ready for further processing. FIG. 6 shows the narrow-faced blades 104 running the full height of the prior art rotor 110. Thus, unlike the present invention, there is no stretching effect cause by the reverse chevron pattern of numerous blades, each of which occupy only a portion of the full height of the rotor 28.

Having now described the invention in accordance with the requirements of the patent statues, those skilled in this art will understand how to make changes and modifications in the present invention to meet their specific requirements or conditions. Such changes and modifications may be made without departing from the scope and spirit of the invention as set forth in the following claims.

I claim:

1. A device for cutting tires and separating the elastomeric materials from the inelastic materials therein, comprising:

a cutting means, comprising at least one rotating blade and at least one fixed blade, said at least one fixed blade and said at least one rotating blade mounted in an opposing relationship, for cutting tires and urging same into said cutting means;

an intake means, coupled to the cutting means, having one or more intake rollers for urging tires into the cutting means at a predetermined speed and resisting any force urging tires into the cutting means at a faster rate of speed;

a motor means for transmitting rotational movement to the cutting means and the rollers of the intake means;

wherein tires are fed into the cutting means by the intake means at a slower speed than said tires are urged into the cutting means by the opposed rotating and fixed blades, causing substantially greater stretching of the elastomeric materials but only insubstantial stretching of the inelastic materials thereby liberating the elastomeric materials from the inelastic materials.

2. The device of claim 1 further comprising a magnetic separator, in which magnetic attraction is used to separate metallic inelastic materials from non-metallic elastomeric materials.

3. The device of claim 1 wherein the cutting means further comprises:

- a rotor, capable of rotational movement and interconnected to a motor means, with one or more of said rotational blades mounted thereto;
- at least one screen partially surrounding the rotor defining apertures for restraining tire pieces larger than a predetermined size from exiting the cutting means, while permitting tire pieces of or smaller than said predetermined size to pass there through;
- at least one screen frame mounted to a screen;
- at least one cutter mount for mounting said fixed blade to a screen and screen frame;
- wherein rotational movement of the rotor causes said rotating blades to pass adjacent to one of said fixed blades, drawing the tire into the cutting means and cutting the tire.

4. The device of claim 3 wherein each screen frame is coupled to a frame of the device and adds structural support to the device.

5. The device of claim 3 wherein said at least one rotating blade has a cutting face having a height and a width in which the height forms a line generally parallel to the direction of the rotational movement of the rotor, and the width forms a line generally perpendicular to the direction of the rotational movement of the rotor, and further has a broad cutting face in which the width of the cutting face is not greater than its height, wherein said tire is compressed between the cutting face and the fixed blade, thereby further liberating the elastomeric materials from the inelastic materials.

6. The device of claim 5 wherein the cutting face urges tire parts against the screen whereby friction sheers off part of the tire part.

7. The device of claim 3 wherein said at least one screen is elliptical in shape, said ellipse having a first end and a second end, the first end being more distant from the rotor and the second end being closer to the rotor.

8. The device of claim 3 wherein said at least one rotating blade urges tire pieces against said screen thereby sheering elastomeric and inelastic materials from said tire pieces and allowing such sheered materials to pass through the screen.

9. The device of claim 3 wherein said at least one screen comprises two screens, said at least one screen frame comprises two screen frames, said at least one cutter mount comprises two cutter mounts, and said at least one fixed blade comprises two fixed blades.

10. The device of claim 1 wherein the intake means further comprises a compression means for urging the intake roller against the tire, whereas any force pulling the tire into the cutting means at a rate faster than the predetermined rate of speed of the intake roller, is resisted by the intake roller.

11. The device of claim 10 wherein the compression means is a spring.

12. The device of claim 1 further comprising:

- a sensing means for determining the volume of tire material within the cutting means;
- a variable governor means for altering the speed of the intake rollers in response to said sensing means; and
- a communication means for transferring data from the sensing means to the communication means;
- whereby when the sensing means determines that the volume of tire material within the cutting means exceeds a predetermined value, the communication means signals the variable governor means, which slows the speed of the intake rollers, and when the sensing means determines that the volume of tire material within the cutting means falls below a predetermined value, the communication means signals the variable governor means, which increases the speed of the intake rollers.

13. The device of claim 1 wherein said at least one fixed blade comprises at least two fixed blades.

14. The device of claim 1 wherein said at least one rotating blade comprises at least five rotating blades.

15. The device of claim 14 wherein the cutting blades are arranged in a V-shaped, chevron design.

16. A method for cutting tires and liberating elastomeric materials from inelastic materials therein, comprising the steps of:

pulling a tire by a first end at a predetermined rate of speed;

opposing such pulling by limiting movement of a second end of said tire to a lesser rate of speed; and cutting and compressing the tire between two surfaces.

17. The method of claim 16 further comprising the step of urging the cut tire pieces against a filter screen.

* * * * *

UNITED STATES PATENT AND TRADEMARK OFFICE
CERTIFICATE OF CORRECTION

PATENT NO. : 5,695,131

DATED : December 9, 1997

INVENTOR(S) : REINER WENZEL

It is certified that error appears in the above-indentified patent and that said Letters Patent is hereby corrected as shown below:

| COLUMN | LINE | |
|---|---|---|
| 1 | 6 | Replace "fire" with -- tire -- |
| 4 | 62 | Delete the word "the" |
| 4 | 66 | Replace "seventy" with -- seven -- |
| 5 | 1 | Replace "Five" with -- five -- |
| 5 | 7 | Delete the word "a" |
| 5 | 47 | Replace "shredder/separators" with -- shredder/separator -- |
| 6 | 49 | Delete the right parenthetical [")"] |
| 7 | 27 | Replace "sheeting" with -- with sheering -- |
| 8 | 54 | Replace "statues" with -- statutes -- |
| 10 | 23 | Delete the word "and" |

UNITED STATES PATENT AND TRADEMARK OFFICE
CERTIFICATE OF CORRECTION

Page 2 of 2

PATENT NO.   : 5,695,131
DATED        : December 9, 1997
INVENTOR(S)  : Reiner Wenzel It is certified that error appears in the above-identified patent and that said Letters Patent is hereby corrected as shown below:

| Column | Line | |
|---|---|---|
| 10 | 25 | After the semi-colon, insert -- and -- |

Signed and Sealed this

Nineteenth Day of May, 1998

Attest:

BRUCE LEHMAN

Attesting Officer

Commissioner of Patents and Trademarks